United States Patent [19]

Shulz

[11] 4,073,226
[45] Feb. 14, 1978

[54] PROCESSING APPARATUS

[75] Inventor: Robert J. Shulz, Brookfield, Ill.

[73] Assignee: Innovative Patent Trust, Palatine, Ill.

[21] Appl. No.: 726,594

[22] Filed: Sept. 27, 1976

[51] Int. Cl.$^2$ .................. A47J 27/00; B65G 19/00
[52] U.S. Cl. .................................. 99/427; 99/443 C; 198/729
[58] Field of Search .................. 99/427, 323.4, 323.9, 99/360–361, 367, 368, 426, 443 C, 452, 516; 198/733–734, 735, 729

[56] References Cited

U.S. PATENT DOCUMENTS

| 1,048,019 | 12/1912 | Wilson | 99/443 C X |
|---|---|---|---|
| 2,357,651 | 9/1944 | Hapman | 99/443 C X |
| 2,556,385 | 6/1951 | Allan | 99/443 C X |
| 2,610,914 | 9/1952 | Cassidy et al. | 99/443 C X |
| 2,711,369 | 6/1955 | Birdseye | 99/323.4 X |
| 2,767,825 | 10/1956 | Welch | 198/734 X |
| 2,907,480 | 10/1959 | Vincent | 198/729 X |
| 3,086,868 | 4/1963 | Keifer | 99/443 C X |
| 3,762,535 | 10/1973 | Becker et al. | 198/729 X |
| 3,908,034 | 9/1975 | Paugh | 99/323.4 X |

Primary Examiner—Leonard D. Christian
Assistant Examiner—Arthur O. Henderson
Attorney, Agent, or Firm—Edmond T. Patnaude

[57] ABSTRACT

Circular sealing partitions are moved through a cylindrical vessel open at both ends and to a central portion of which a processing fluid is continuously supplied through a port in the wall of the vessel.

8 Claims, 14 Drawing Figures

PROCESSING APPARATUS

The present invention relates in general to processing methods and apparatus wherein a product is treated with a processing fluid, and it relates in particular to a new and improved method and apparatus wherein a product is carried through a cylindrical processing vessel between sealing partitions which move in spaced apart relationship through the vessel to provide separate hermetically sealed compartments which move through the vessel.

BACKGROUND OF THE INVENTION

In batch processing, the customary practice is to place the product in a processing vessel wherein it is treated by a fluid already contained in or later introduced into the vessel. Where the processing is carried out at non-ambient pressure or where the processing fluid should not be exposed to the ambient, the vessel is hermetically sealed by a cover or the like.

For the most part, food products are processed in batches by contacting the product with a hot, heat transfer fluid such as water or steam. Pressure cookers are commonly used where large quantities of a product are to be cooked as, for example, in a canning plant. In one such type of cooker the food is carried through a steam filled pressure vessel by means of a screw or augur. Decompression compartments are located at the ends of the vessel to permit the continuous passage of the product into and out of the vessel. Such cookers are not only expensive to manufacture and maintain, but they are suitable only for use with bulk-type items.

There is a need for a conveyorized processing apparatus and method wherein batches of a product are separately processed on a continuous basis. Such apparatus will enable the processing of fragile products and will, in addition, permit the use of a sequence of different processing steps in an automated system. When used in preparing frozen food, for example, on a continuous basis the food may be initially defrosted at about ambient pressure and then cooked at an elevated pressure.

SUMMARY OF THE INVENTION

Briefly, there is provided in accordance with the present invention a method and apparatus wherein a product to be processed is carried through a cylindrical processing vessel, open at both ends, between imperforate, circular partitions which are peripherally sealed to the wall of the vessel. Fluid inlet and outlet ports are provided at particular locations in the wall of the vessel so that fluid is supplied or removed from the spaces between the partitions as the partitions and the product move through the vessel. Each quantity of product located between adjacent partitions is thus treated as a batch although the overall process is continuous.

The invention is particularly described in conjunction with a pressure cooking system, but the basic concept has other applications where a product is to be processed in an automated system.

GENERAL DESCRIPTION OF THE DRAWINGS

Further objects and advantages and a better understanding of the present invention can be had by reference to the following detailed description, wherein.

DETAILED DESCRIPTION OF THE INVENTION

Figure 1:
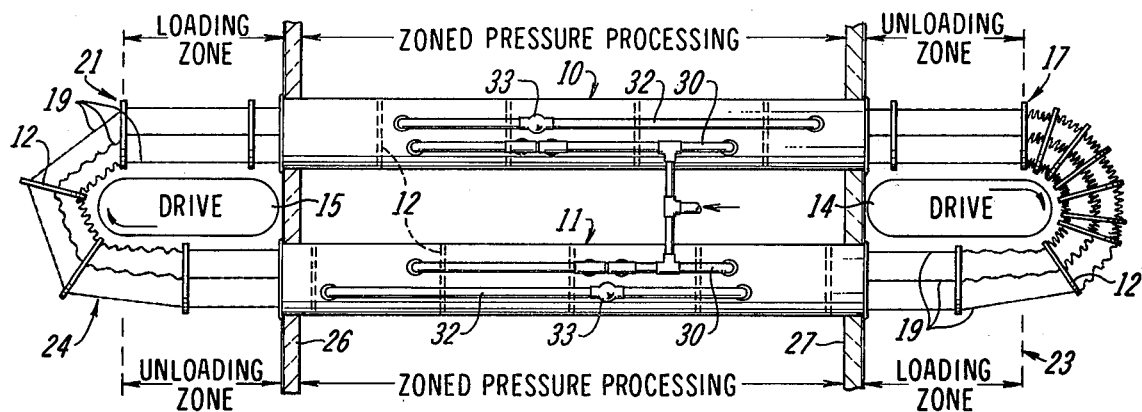
FIG. 1 is a plan view of a processing apparatus embodying the present invention.

Referring particularly to FIG. 1, a pair of rigid, cylindrical tubes 10 and 11 are each open at both ends and provide a pair of processing vessels in which a product is processed as it is carried through each vessel from one end to the other. Preferably the cylinders 10 and 11 are fabricated of stainless steel and may each be a single one-piece tube or a plurality of externally flanged tubular sections sealably secured together in aligned end-to-end relationship. A plurality of imperforate, circular partitions 12 include peripheral seals, more fully described hereinafter in connection with FIGS. 3, 5 and 6, which slidably and sealably engage the inner walls of the cylinders 10 and 11 as the partitions move therethrough. The partitions 12 are mutually interconnected by drive means which moves the partitions in spaced apart relationship through the vessels. As illustrated in FIG. 1, the partitions 12 move in a clockwise direction from left to right through the vessel 10 and from right to left through the vessel 11. The spaces between the adjacent partitions 12 located in each vessel are hermetically sealed from the remainder of the vessel and from one another by means of the partitions. These spaces thus constitute individual processing compartments, and the product to be processed may be located therein either in loose bulk form or preferably in suitable pans or baskets. As described hereinafter in connection with FIG. 7, the pans or baskets may be carried by racks mounted on the faces of the partitions.

Mounted at the two ends of the vessels are drive means 14 and 15, shown in schematic form only, which function to move the partitions 12 in spaced apart relationship through the vessels 10 and 11. The drive means 14 attaches to each of the partitions 12 as it moves out of the vessel 10 and pulls it to about the position indicated at 17. The partitions 12 are interconnected by collapsible or flexible tensile means such as plurality of chains 19 whereby the drive means 14 pulls the partitions 12 from about the position indicated at about 21 to about the position at 17. In like manner the drive means 15 pulls the partitions 12 from about the position indicated at 23 to about the position indicated at 24. A sufficient number of partitions 12 are provided so that they stack up at the ends and are pushed by one drive means around the ends to the location from which they are then pulled by the other drive means. Any suitable mechanism may be used for this purpose.

Unloading stations are provided at the exit ends of both vessels, and loading stations are provided at the entrance ends of both vessels. It will be understood by those skilled in the art that only one vessel need be provided, and in that case the partitions will simply travel in the open from the exit end to the entrance end of the vessel.

Where the apparatus of FIG. 1 is to be used for pressure cooking or for some other application where the processing temperature is substantially less or greater than ambient temperature, the processing vessels may be separated from the loading and unloading zones by suitable insulating partitions or walls 26 and 27. Such walls are particularly desirable if the loading and unloading operations are to be performed manually.

Refer now to FIGS. 2A–2F for a better understanding of the manner in which the present invention finds application in a pressure cooking system. While the vessel 11 is the only one shown in FIG. 2, it will be understood that vessel 10 may be operated in the same manner. As shown in each of these Figures, a source of steam is connected via a conduit 30 to a plurality of longitudinally spaced openings 30a, 30b, 30c and 30d in the wall of the vessel 11. A conduit 32 is connected between openings 32a and 32b near the front and rear of the vessel and a check valve 33 is provided therein to permit unidirectional flow of steam from the rear to the foreward portion of the vessel. A conduit 34 is connected from the bottom of the vessel to a conventional steam trap 35 through which condensate is drained from the system. A pair of exhaust ports 37 and 38 connect to the ambient from locations near the front and rear ends of the vessel.

Figure 2:
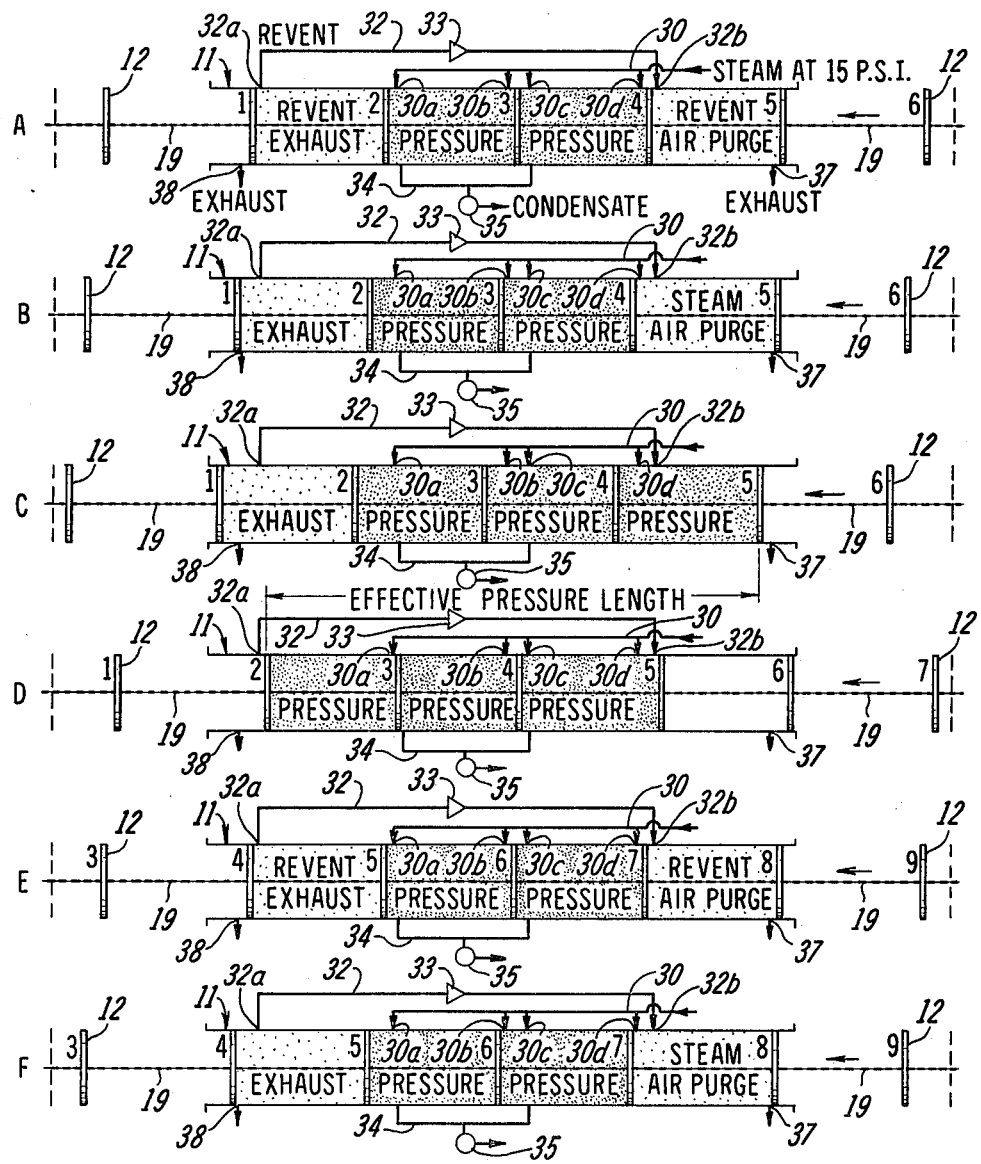
FIGS. 2A - 2F are illustrative of the different phases in a complete processing cycle being carried out in the apparatus of FIG. 1.

As shown in FIG. 2, the partitions 12 move from right to left and the successive FIGS. 2A to 2F show the sequential positions of the compartments between the partitions 12 during a processing cycle. The compartments are respectively identified by the numerals 1 through 9.

In FIG. 2A the rear partition defining the compartment 5 has just entered the vessel 11 and the forward partition has just moved past the port 32b. When the compartment 5 is in this position the forward partition of the compartment 2 has moved past, to the left, of port 32a. Consequently, the compartment 2 and the compartment 5 are interconnected by the conduit 32. Since the compartment 2 had previously been pressurized with steam, that steam flows through the check valve 33 to the compartment 5. At the beginning of the processing cycle of the product, the associated compartment is open to the atmosphere, through an exhaust port 37 whereby the steam entering therein through the port 32b purges some of the air from the compartment and also raises the temperature therein. If the product is frozen, it is at least partially defrosted at a relatively low temperature during this phase of the process since the steam from the compartment at the rear of the vessel merely passes therethrough at about atmospheric pressure. During this same period, the pressure in the compartment 2 drops to about ambient or atmospheric pressure as the steam therein flows to the ambient through the exhaust port 37 from the compartment 5 and the conduit 32.

As shown in FIG. 2B, after the forward partition of the compartment 5 has passed the steam inlet port 30d but the rear partition has not yet reached the exhaust port 37, high pressure steam enters the compartment 5 to complete the air purge phase of the cycle which continues until the time the rear partition has moved past the exhaust port 37 to the position shown in FIG. 2c. The compartment 5 now becomes fully pressurized with steam. The check valve 33 prevents the flow of steam to the compartment 2 which remains open to the ambient to permit further cooling. The product remains under pressure until the forward partition of the compartment 5 moves past the port 32a to the position shown in FIG. 2E.

As the forward partition of the compartment 5 passes across the port 32a thereby to connect the compartment 5 to the conduit 32, the rear partition passes the port 30a to disconnect the compartment 5 from the source of steam. The steam from compartment 5 thus flows into the compartment 8 at the front end of the vessel and to the ambient through the exhaust port 37. The forward partition of the compartment 5 then moves across the rear exhaust port 38 directly to connect the compartment 5 to the ambient so that by the time the forward partition moves out of the vessel the associated compartment is at ambient pressure and little if any steam remains therein.

It may be seen by those skilled in the art that where desired the product carried in the compartments can be contacted with different fluids at the same or different temperatures or pressures as it is carried from one end of the vessel to the other. The partitions function to define and seal off the separate compartments and also function as valve elements to control the flow of fluids into and out of the compartments.

Figure 3:
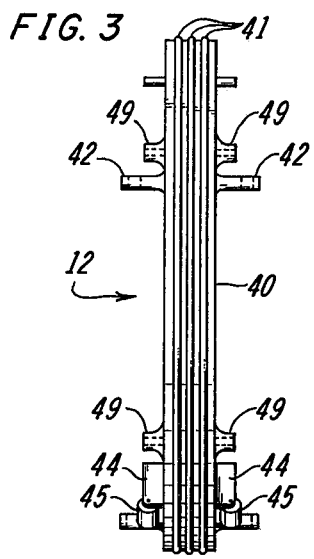
FIG. 3 is a side view of one of the partitions employed in the apparatus of FIG. 1.
Figure 4:
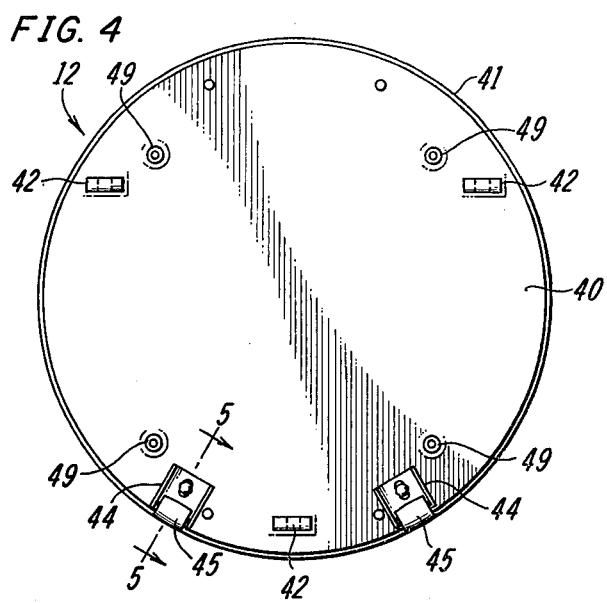
FIG. 4 is a front view of the partition of FIG. 3.
Figure 5:
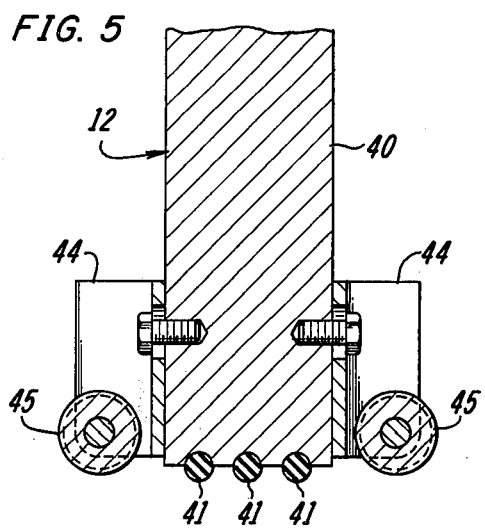
FIG. 5 is an enlarged side view of the bottom portion of the partition of FIG. 3.

Refer now to FIGS. 3 and 4 for a more detailed description of the partitions 12. The partitions 12 are mutually identical and each includes an imperforate cylindrical body 40 which may be a metal casting having a plurality of circumferential grooves respectively receiving one of a plurality of resilient O-rings 41. Three integral lugs 42 are symmetrically arranged on each face of the body 40 for connection to the chains 19. A pair of roller supporting brackets 44 are mounted to each face of the body 40 near the bottom. Each bracket 44 rotatably supports a roller 45 which rolls on the lower portion of the vessel wall partially to support the weight of the associated partition and thereby prevent excessive compression of the sealing rings 41. As best shown in FIG. 5, the perimeters of the rollers 41 extend outwardly beyond the periphery of the body 40 by a distance equal to about half the distance the sealing rings 41 extend outwardly thereof. In this manner each ring sealably engages the vessel throughout a complete 360° as the partitions move through the vessel.

Figure 6A:
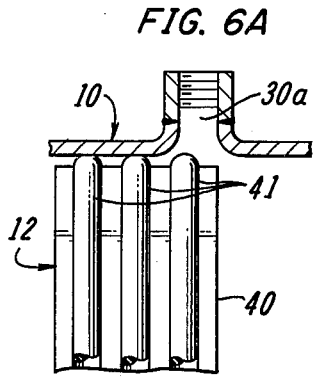
FIGS. 6A - 6C are side views of the upper portion of the partition of FIG. 3 in three different positions relative to a fluid port in the wall of the vessel.
Figure 6B:
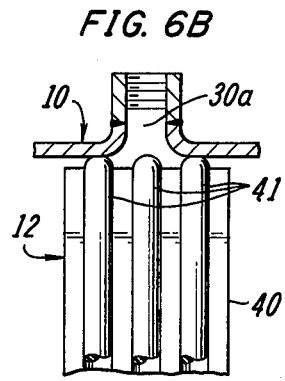
Figure 6C:
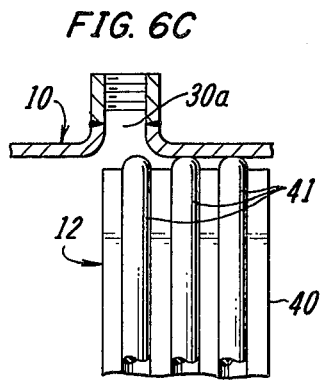

With reference to FIGS. 6A–6C it may be seen that the two external sealing rings 41 are spaced apart by a distance exceeding the maximum diameter of the inlet and outlet ports in the wall of the vessel wherefor the compartments to the right and left of the partition are never in mutual communication. All of these ports preferably are of the same size and shape and only the port 30a is thus shown. FIGS. 6A–6C show the different valving positions of a partition 12 as it moves from left to right past a port 30a. In the position shown in FIG. 6A the compartment to the right of the illustrated partition is connected to the port 30a. In the position of FIG. 6B the compartments both to the left and right of the partition are disconnected from the port 30a. In the position of the partition shown in FIG. 6C the compartment to the right is disconnected from the port 30a while the compartment to the left is connected to the port 30a. It may thus be seen that the partitions 12 function as control valves wherefor external control valves are not required to control the sequence in which the processing fluids enter and exit the processing compartments.

Figure 7:
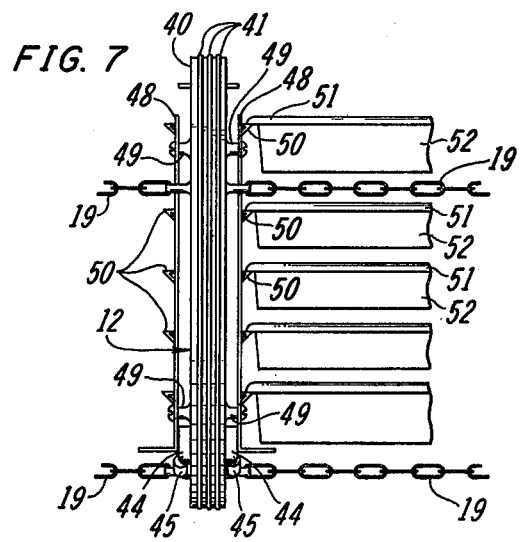
FIG. 7 is a side view of a partition showing associated pan racks and pans supported thereby for carrying a product through the associated vessel.

Referring to FIG. 7, a plurality of racks 48 are respectively mounted on the integral bosses 49 on the faces of the partition bodies 40. The racks each have a plurality of ledges 50 on which the lips 51 of suitable containers such as pans 52 rest. The pans may be perforate or imperforate as the product dictates and may be used to carry the food through the vessel. Several pans 52 are shown in FIG. 7 but a single pan or basket or a plurality of baskets may be used if desired.

OPERATION

Assuming that the apparatus of FIG. 1 is to be used for cooking vegetables under pressure, with the drives 14 and 15 continuously operating the partitions 12 continuously move in a clockwise direction. The vegetables are suitably loaded between the partitions moving through the loading stations just prior to entering the vessels. Using the arrangement of FIG. 7, preloaded pans or baskets of the vegetables are placed onto the racks 48 at this time. Shortly after the rear end of the pans have entered the vessel, the first phase of the cooking cycle begins when steam is revented into the respective compartment to initiate the air venting phase and to begin slowly to heat the vegetables. If the vegetables are frozen they begin to defrost at this time. Accordingly, over cooking of the outside surfaces of the frozen vegetables prior to defrosting of the inside is avoided.

The second phase begins shortly thereafter when steam at a temperature of 250° F and a pressure of 15 p.s.i. enters the front of the compartment through the steam inlet port 30d and exits from the rear through exhaust port 37 to complete the air purge operation. As is well known, it is important to purge substantially all of the air from the cooking compartment if an efficient pressure cooking operation is to be achieved.

In the next phase of the cooking cycle the compartment remains connected to the steam source and sealed from the ambient. This is the portion of the cycle when the principal part of the cooking takes place.

At the end of the high pressure phase of the cycle the compartment is partially vented to the ambient through the compartment which has just entered the vessel. Shortly thereafter the compartment is vented through the exhaust port 38 and then moves out of the vessel to the unloading station where the cooked vegetables are then removed.

In the illustrated cooking apparatus the pressure cooking phase is substantially longer than the defrost-preheat stage and the steam exhaust phase. However, the relative lengths of these phases may be readily changed by moving the inlet and outlet ports or by changing the ports to which the inlet and revent conduits are connected. The overall time of the cycle is adjusted by simply changing the speed at which the partitions move through the vessel. For example, peas should pass through the vessel in less than one minute while the cooking period for corn is several minutes. It may be seen therefor, that different products may be processed simply by changing the speed of the drive mechanisms 14 and 15.

In addition to the system of the present invention being used for processing food products, the present invention has many other applications. By way of example only, it may be used as a continuous autoclave for purposes of sterilization and it may be used as a vulcanizing oven. Also, it may be used as a dryer by supplying dry heated air instead of steam to the vessel.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. Processing apparatus, comprising
   an elongated hollow cylinder open at both ends,
   a plurality of imperforate circular partitions,
   a plurality of sealing means each circumferentially disposed on a respective one of said partitions,
   said partitions being movable in spaced apart relationship through said cylinder with said sealing means sealably engaging said cylinder,
   said partitions being spaced apart by a distance less than the length of said cylinder to provide a hermetically sealed compartment between said partitions,
   a processing fluid inlet port in the wall of said cylinder and spaced from the ends thereof by distances greater than the distance between said partitions,
   drive means connected to said partitions for moving said partitions in said spaced apart relationship through said cylinder,
   means for connecting a source of processing fluid to said processing fluid inlet port thereby to introduce a processing fluid through the wall of said cylinder into the space between said partitions as said partitions move through said cylinder,
   a pair of revent ports respectively provided in said cylinder near the ends thereof, and
   conduit means including a unidirectional flow device connected between said pair of revent ports for coupling steam from a location near the exit end of said cylinder to a location near the forward end of said cylinder.

2. Processing apparatus according to claim 1 wherein said processing fluid is pressurized steam,
   said processing fluid inlet port being spaced from the ends of said cylinder by a distance greater than the distance between said partitions.

3. Processing apparatus according to claim 1 comprising
   an exhaust port in the wall of said cylinder near the entrance end thereof,
   said exhaust port being longitudinally spaced from the one of said pair of ports closest to the forward end of said cylinder by a distance less than the distance between said partitions.

4. Processing apparatus according to claim 3 wherein the distance between said exhaust port and the closest one of said revent ports is less than the distance between adjacent ones of said partitions.

5. Processing apparatus according to claim 1 comprising
   an exhaust port in the wall of said cylinder near the end through which said partitions move out of said cylinder.

6. Processing apparatus according to claim 1 comprising
   a drain port in the bottom of said cylinder, and
   a steam trap connected between said drain port and the ambient 7. Processing apparatus according to claim 1 comprising
  resilient sealing rings carried by and encircling the edges of said partitions, and
  means mounted to support said partitions and resting on the bottom of the chamber in said vessel as said partitions move therethrough thereby to limit the compression of the lower portions of said rings.

8. Processing apparatus according to claim 7 comprising
  a plurality of spaced apart sealing rings on each of said partitions,
  said rings being spaced apart by a distance greater than the dimensions of said ports in the direction of movement of said partition.

* * * * *